United States Patent [19]

Fagher

[11] Patent Number: 5,229,076

[45] Date of Patent: Jul. 20, 1993

[54] METHOD FOR REDUCING POLYMER BUILD-UP IN A POLYMERIZATION REACTOR

[76] Inventor: Richard H. Fagher, 6668 Crenshaw Dr., Parma Heights, Ohio 44130

[21] Appl. No.: 880,564

[22] Filed: May 8, 1992

[51] Int. Cl.$^5$ ............................................... C08F 2/00
[52] U.S. Cl. .................................. 422/131; 422/241; 526/62; 526/74
[58] Field of Search ...................... 422/131, 240, 241; 526/62, 74

[56] References Cited

U.S. PATENT DOCUMENTS 4,528,336  7/1985  Koyanagi et al. ................... 526/62

Primary Examiner—Robert J. Warden
Assistant Examiner—Timothy M. McMahon
Attorney, Agent, or Firm—Fay, Sharpe, Beall, Fagan, Minnich & McKee

[57] ABSTRACT

The present invention relates to a process for substantially inhibiting polymer build-up on reactor surfaces during polymerization. The method generally comprises the application of a polyaniline coating composition to the reactor surfaces in contact with the reaction medium prior to charging the reactor and the carrying out of the polymerization reaction. The polyaniline coating composition broadly consists of about 0.01 to about 20% by weight of deprotonated polyaniline, such as polyaniline in the pernigraniline oxidation state, dissolved in an organic solvent carrier, such as dimethyl sulfoxide (DMSO), 1-methyl-2-pyrrolidinone (NMP), acetic acid, sulfuric acid, formic acid and tetrahydrofuran (THF).

17 Claims, 5 Drawing Sheets

Concentrations of Polyaniline Standards (mg/ml)

METHOD FOR REDUCING POLYMER BUILD-UP IN A POLYMERIZATION REACTOR

FIELD OF THE INVENTION

The present invention is directed to a method for substantially reducing polymer build-up on reactor surfaces during polymerization. More particularly, this invention relates to the suppression of the build-up of polymer which occurs on the reactor surfaces that are in contact with the reaction medium during a polymerization reaction, such polymer build-up resulting in reactor fouling. The reduction is obtained by applying a polyaniline composition, such as by spraying a polyaniline coating solution, onto the reactor surfaces that are in contact with the reaction medium. It has been found that the polyaniline composition produces a reactor coating or film which inhibits polymer build-up by, among other things, dissipating the static charge that occurs during the polymerization reaction.

While the invention is particularly directed to the art of inhibiting polymer build-up in polymerization reactions during the production of various vinyl chloride compositions, and will thus be described with specific reference thereto, it will be appreciated that the invention is useful in other fields and applications, including but not limited to, the polymerization of olefinic monomers where undesirable polymer build-up or reactor fouling occurs.

BACKGROUND OF THE INVENTION

Reactor fouling during polymerization reaction is due to the build-up of adherent polymer on internal surfaces, such as on the heat-transfer surfaces, of the polymerization reaction vessel. For example, in solution polymerization, these deposits may consist of polymer gels that are insoluble in the solvent used. The gel deposits impede the efficient transfers of heat, as well as result in the contamination of the reaction mixture and the products produced therefrom.

In emulsion polymerization, the build-up may be a coagulum formed because of excessive shear produced by the agitator or the build-up may be caused by the impingement of sticky semipolymerized droplets against the reactor wall. Such build-up decreases productivity and interferes with the quality of the end product. Thus, although the mechanism may differ depending upon the type of polymerization process being utilized, polymer build-up is a severe problem in the art of polymer production.

Over the years, a number of mechanisms and methods have been developed in an attempt to overcome the problems produced by polymer build-up. These have been produced with the aim of maximizing the rate of product output (i.e. the quantity of polymer per unit time) without sacrificing the most relevant polymer properties and concurrently minimizing costs.

For example different materials (i.e. polished steel, aluminum, glass, nylon, polyethylene etc.) have been utilized to line the reactor surfaces in order to avoid polymer adhesion. However, these materials have not been generally effective because in the absence cleaning of the reactor surfaces, polymer build-up still occurs. Furthermore, since polymerization of the vinyl chloride monomer takes place in an acidic environment due to the presence of vinyl chloride in the system which releases minute amounts of hydrochloric acid (HCl), the HCl so produced will attack the reaction vessel linings.

Consequently, cleaning of polymerization reactors has been accomplished for many years by manual scraping and chipping. However, this type of cleaning is not only costly with respect to labor and reactor/equipment downtime, it tends to damage the reaction vessel surfaces causing scratches and imperfections that tend to foul more quickly, resulting in more frequent cleaning schedules.

In addition, specially designed tools and mechanical scraping devices have been developed to minimize damage to the reactor surfaces. In some reaction vessels, automated apparatuses such as hydraulic cleaning devices have been installed. These mechanical devices can be utilized in conjunction with various chemical solvents which may be applied, i.e. such as sprayed onto the reaction vessel surfaces, to dissolve the polymer deposit. However, if the polymerization process is sensitive to such solvents, the reaction vessel must be washed and dried thoroughly after cleaning, resulting in additional reactor down-time.

In other reactors, spray rinse valves have been installed to allow the washing of the reaction vessel walls while the reactor is emptying. Additives may be applied to the reaction vessel walls in order to condition the walls for subsequent polymerization.

Along these lines, a number of coating and/or conditioning compositions have been produced for the purpose of inhibiting polymer build-up. These materials are normally sprayed or wiped onto the reactor surfaces before charging and are added to the reactor medium shortly after polymerization has begun in order to prevent, or reduce, fouling of the reactor wall.

For example, U.S. Pat. No. 4,080,173 teaches using self-condensation products of resorcinol as a reactor coating to prevent polymer build-up. U.S. Pat. No. 4,035,563 discloses using in the aqueous reaction medium, salts of nitrous acids such as sodium nitrite together with polyvalent metal salts as a system to reduce build-up on the walls of the reactor in a vinyl chloride polymerization process. U.S. Pat. No. 4,024,301 teaches using a coating composition consisting of an alkali metal hydroxide solution and a polyaromatic amine. U.S. Pat. No. 4,068,052 describes the use of dithiooxamide/aluminum mixtures to prevent build-up.

However, many of these materials are mildly toxic and often cause polymer odor and extrusion which is unacceptable for many applications. In addition, these methods and compositions are generally unacceptable because the amount of polymer build-up is insufficient and/or the properties of the polymerized product produced thereby are substantially altered.

Moreover, according to U.S. Pat. No. 4,659,791, the reactor coatings currently used in the polyvinyl chloride industry are primarily phenol materials such as self-condensed phenols or phenols condensed with other materials such as aldehydes or amines. Other aromatic compounds used as reactor coatings are thiodiphenols and their derivatives as well as poly aromatic amines (molecular weight range 200–1000). While these coatings have exhibited enhanced results in comparison to situations where no coatings have been applied, a number of major disadvantages remain including color deformation, odor, costs, durability, miscibility in reaction ingredients, thermal instability, inclusion of polymerization inhibitors, environmental hazard, etc.

The present invention is directed to the development of a more durable, more efficient and environmentally safer product that can be applied to reactor surfaces in order to substantially reduce polymer build-up. The polyaniline coating composition of the present invention exhibits excellent static discharge or electrostatic dissipation characteristics. In addition, as a result of its high degree of crystallinity, the polyaniline coating composition of the present invention exhibits excellent thermal stability when subjected to continuous operation at elevated temperatures (i.e. exhibits stability up to 700° F.). The composition is insoluble in methanol and other general polymerization ingredients, is easily processed and inexpensive to produce and may be easily applied to reactor walls. Other objects of the invention may become apparent to those skilled in the art as the description proceeds.

SUMMARY OF THE INVENTION

In accordance with the present invention, a method is provided for substantially reducing the build-up of polymer on the internal surfaces of a polymerization reaction vessel. The method comprises the steps of applying a polyaniline coating composition or solution to the surfaces of a polymerization reactor which come into contact with the reaction medium during the polymerization reaction. The polyaniline coating composition is generally comprised of a polyaniline polymer, such as a deprotonated (or dehydrogenated) polyaniline polymer in the pernigraniline oxidation state, and an organic solvent, such as N-methyl-b 2-pyrrolidinone (NMP). It has been found that when the polyaniline coating composition is applied, i.e. sprayed, brushed, painted, wiped, etc., onto the surfaces of the polymerization reactor, undesirable polymer build-up on said surfaces can be substantially reduced.

Further scope of the applicability of the present invention will become apparent from the detailed description provided below. It should be understood, however, that the detailed description and specific examples, while indicating preferred embodiments of the invention, are given by way of illustration only, since various changes and modification within the spirit and scope of the invention will become apparent to those skilled in the art.

DESCRIPTION OF THE DRAWINGS

The following is a description of the drawings which are presented for the purpose of illustrating the invention and not for the purpose of limiting same.

DETAILED DESCRIPTION OF THE INVENTION

Figure 1:
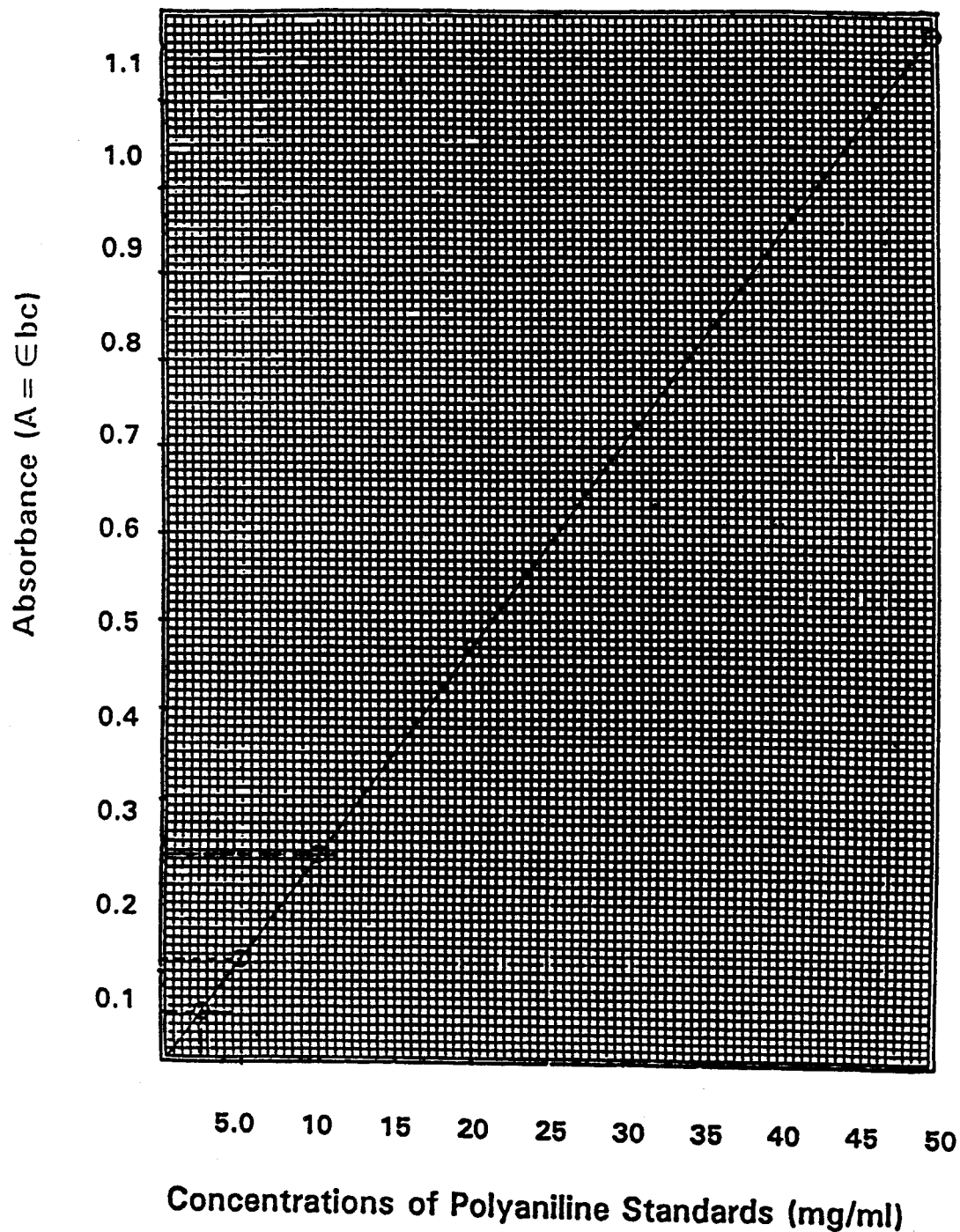
FIG. 1 is a graph showing the absorbance ($A = \epsilon bc$) of various concentrations of polyaniline (deprotonated or dehydrogenated).

The present invention relates to a process for substantially inhibiting polymer build-up on reactor surfaces during polymerization. The method generally comprises the application of a polyaniline coating composition to the reactor surfaces in contact with the reaction medium prior to the charging the reactor and the carrying out of the polymerization reaction. The polyaniline coating composition generally consists of about 0.01 to about 20% by weight of polyaniline, such as the deprotonated (or dehydrogenated) polyaniline in the pernigraniline oxidation state, dissolved in an organic solvent carrier, such as dimethyl sulfoxide (DMSO), 1-methyl-2-pyrrolidinone (NMP), acetic acid, sulfuric acid, formic acid, dimethyl formamide, and tetrahydrofuran (THF). The concentration range is from about 0.01% to about 20% by weight of the polyaniline in the organic solvent, more preferably about 0.01% to about 5%, and most preferably about 0.01-2%.

Polyaniline and its derivatives can be prepared by the chemical or electrochemical oxidative polymerization of aniline, $C_6H_5NH_2$. Because of its excellent chemical stability and the relatively high levels of electrical conductivity of certain forms of the material, attention has been recently directed to polyaniline, particularly in emeraldine (i.e. emeraldine base) oxidation state (y equals about 0.5) can be represented by the formula:

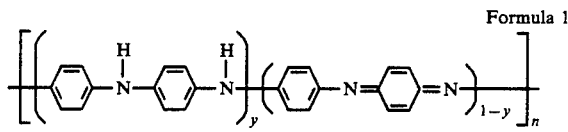

Formula 1 which contains equal numbers of alternating reduced,

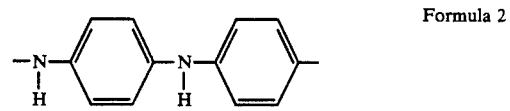

Formula 2 and oxidized,

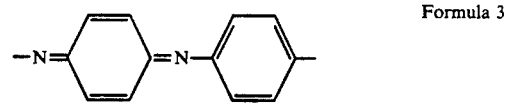

Formula 3 repeat units.

In Formula 1 above, when y is greater than 0 and less than 1, the polyanilines are poly(paraphenylene-amine imines) in which the oxidation state of the polymer increases with decreasing value of y. The fully reduced form of polyaniline (i.e. $y=1$, $[-(NH-C_6H_4)-NH-(C_6H_4)-]_x$, poly paraphenylene amine) is referred to as "leucoemeraldine" (or "white-emeraldine") and the fully oxidized form of polyaniline (i.e. $y=0$, $[-N=(C_6H_4)=N-(C_6H_4)-]$, poly paraphenylene imine) is referred to as "pernigraniline". As indicated above, the 50% oxidized polyaniline (i.e. $y=0.5$, poly(paraphenyleneamineimine)) is referred to as "emeraldine". Thus, the terms "leucoemeraldine", "emeraldine" and "pernigraniline" refer to the different oxidation states of polyaniline.

In addition, each oxidation state of polyaniline can exist in the form of its base or as its protonated form (salt) by treatment of the base with an acid. For example, the emeraldine base can be protonated by dilute aqueous "emeraldine" and "pernigraniline" refer to the different oxidation states of polyaniline.

In addition, each oxidation state of polyaniline can exist in the form of its base or as its protonated form (salt) by treatment of the base with an acid. For example, the emeraldine base can be protonated by dilute aqueous protonic acids such as hydrochloric acid (HCl) to produce the corresponding salt (A=anion):

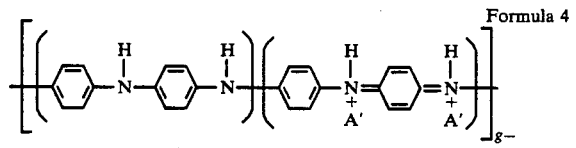

Formula 4

The emeraldine salt, i.e. emeraldine hydrochloride, exhibits conductivities of about 1–5 S/cm (Siemens/cm) when approximately half of its nitrogen atoms are protonated as shown above. The emeraldine salt is generally known as the conductive form of polyaniline.

While the exact polymer build-up inhibition mechanism is not known for certain, it is thought that the polyaniline coating composition in the deprotonated form (i.e. blue color pernigraniline oxidation state) comes in contact with an acidic medium, i.e. the vinyl chloride monomer (VCM)/$H_2O$ suspension, it immediately converts to the more conductive emeraldine base form (green color) which, because of its high conductivity, plays a major role in the static dissipation of the charge. At any rate, the coating composition of the present invention substantially reduces polymer build-up in reactor surfaces. Moreover, it is believed that as a result of the adherence properties of the coating composition, multiple polymerization reactions may be run without the necessity of recoating the surfaces.

The polyaniline utilized in the coating composition of the invention can be generally chemically synthesized by the oxidative polymerization of aniline under aqueous acidic conditions. More specifically, in the oxidative polymerization of aniline, a strong oxidant (such as ammonium peroxydisulfate (($NH_4$)$_2S_2O_8$)) is added to an aqueous protonic acid (such as hydrochloric acid) solution containing aniline. The strong oxidant is needed to oxidize aniline. The resulting solution is maintained at a temperature of about 0° C. to about 25° C., with temperatures below 15° C. (i.e. 0° C. to 15° C.) being more preferred.

It will be apparent to one skilled in the art, however, that with some protonic acids and/or oxidants, the temperature could be lower. Generally, the higher the temperature, the lower the molecular weight of polyaniline and the greater the rate of reaction, including undesirable side reactions.

Upon the addition of the oxidant, aniline then undergoes oxidative polymerization. The precipitate is collected and washed with hydrochloric acid to yield the emeraldine hydrochloride (the emeraldine base oxidation state of polyaniline).

The conductive emeraldine base material so produced (i.e. the hydrochloride salt) can be deprotonated, if desired, to enhance its solubility in organic solvents in a base such as an ammonium hydroxide ($NH_4OH$) or a sodium hydroxide (NaOH) solution, to form the nonconductive pernigraniline form of polyaniline. In this regard, the utility and economic efficiency of the polyaniline is enhanced in a coating composition when the material is highly soluble in organic solvents.

Furthermore, since it is well known that the solubility of a polymer is increased when its molecular weight is decreased, the optimal polyaniline utilized in the present invention has a sufficiently low molecular weight in order to enhance solubility while maintaining high electrical conductivity and good thermal stability properties desired for a polymerization reactor coating composition. Consequently, the polyaniline utilized in the present invention possesses a molecular weight of about 40,000 to about 320,000, more preferably, about 80,000 to about 150,000, most preferred of about 150,000.

While ammonium peroxydisulfate is the desired oxidant utilized to produce the polyaniline component of the polyaniline coating composition of the present invention, other strong oxidants can be employed to catalyze the oxidative polymerization of aniline. Examples of such strong antioxidants include ferric chloride ($FeCl_3$), potassium iodate, chromic acid, and potassium permanganate. The proportion of oxidant employed in the polymerization reaction can range from about 0.05 to about 0.45 mol per mol of monomer (i.e. aniline).

A protonic acid is also employed in conjunction with the oxidant. Examples of suitable protonic (Bronsted) acids include hydrochloric acid, sulfuric acid, phosphoric acid, and nitric acid. The presently preferred acid is hydrochloric acid (HCl). The concentration of the acid depends on the final pH of the reactant solution (containing the aniline monomer, the oxidant, the acid, etc.) which should be acidic with a pH of about 1.0 to about 3.5 being preferred. The proportion of protonic acid employed can range from about 0.1 to about 7.5 mols per mole of monomer (i.e. aniline).

The polyaniline coating compositions including the polyaniline in its nonconductive pernigraniline form contains about 0.5% to about 65% by weight of water in a organic solvent is then applied to the reactor surface. Although drying is not necessary, in some circumstances a drying step may be utilized. As the coating is applied on the vessel surface, the coating adheres to the substrate (i.e. the reactor surface) and the organic solvent remains in water phase without effecting the coating left behind on the reactor wall.

Films or coatings of various thicknesses, e.g. from about 1.0 to about 1500μm, preferably about 1.0 to about 1000 μm, and most preferably from about 5.0 to about 500 μm, can be prepared according to this invention. However, there is no true upper limit to the thickness of the coating, so long as it has no adverse effect on the polymer prepared and/or the overall polymerization process.

When applied to the reactor surfaces, it has been found that the polyaniline coating composition produces a reactor coating or film which inhibits polymer build-up by, among other things, dissipating the static charge that occurs during the polymerization reaction. It is also believed that the polyaniline captures or destroys the free-radicals that are produced during the polymerization reaction. The acidic medium within the reactor vessel due to the presence of vinyl chloride monomer converts the nonconductive polyaniline coating from the pernigraniline oxidation state to the conductive emeraldine base oxidative state. This is evidenced by the change in color of the polyaniline coating from blue to green.

Moreover, the polyaniline coating composition exhibits, when applied to the reactor surfaces, high thermal stability. Specifically, during polymerization the polyaniline coating composition produces a base-type polymer having groups which are thermally stable and remain bound to the nitrogen atoms of the polymer even at high temperatures.

Furthermore, since the coating composition of the invention is insoluble in methanol and other general polymerization ingredients, it does not affect the claimed composition of the polymer produced by the polymerization reaction. In addition, the polyaniline coating composition is simply processed, inexpensive to produce, and is easily applied to reactor walls.

While the present invention is specifically described with regard to the polymerization of vinyl chloride (vinyl chloride is conventionally polymerized at temperatures between about 40° and about 70° C., and at pressure of about 70 to about 150 p.s.i.g.), it is understood that the method may likewise be applied in the suspension, dispersion and emulsion polymerization of any polymerizable monomer where undesirable polymer build-up occurs.

The invention will now be illustrated in more detail with reference to the following specific examples. It is understood, however, that the examples are intended in an illustrative and non-limitative sense.

EXAMPLE 1

Chemical Synthesis of the Polyaniline 2,000 ml (2.0 liters) of 0.1N HCl was prepared and cooled to 0° C. Into the cooled 2,000 ml of 0.1N HCl, 115 grams of ammonium peroxydisulfate ($(NH_4)_2S_2O_8$) was dissolved. The ammonium peroxydisulfate-HCl mixture was cooled to 0°-1° C. by placing it in an ice bath.

In a separate breaker (4 liter), 3,000 ml (3.0 liters) of 0.1N HCl was prepared and cooled to 0° C. Into the 3,000 ml of 0.1N HCl, 200 ml of aniline was dissolved. The aniline—HCl mixture was then transferred into a 6.0 liter Erlenmeyer flask and placed in an ice bath at 0° C., wherein the mixture was mixed while maintaining a temperature at 0°-2° C.

The ammonium peroxydisulfate-HCl mixture was slowly added to the aniline—HCl mixture over a period of 1-2 minutes during constant stirring. The resulting solution showed a green color within 2-5 minutes and a green color precipitate formed within about 15 minutes after the reactants were mixed. The mixture was stirred in the ice bath for 2.5 hours while the temperature was maintained below 2° C. After 2.5 hours, the precipitate was collected on a Buchner funnel using a vacuum pump and Whatman No. 41 filter paper. The precipitate cake was washed with 0.1N HCl solution frequently with 100-200 ml aliquots of 0.1N HCl until the filtrate changed from brown to clear in color. The precipitate was subsequently transferred to a vacuum desiccator and dried under vacuum for 6 hours. The weight of the precipitate after drying was 199.5 grams, with a 3-5% loss attributed to the transfer of the polymer from the desiccator to the oven and product adherence to the filter paper. The product was then dried in the vacuum oven at 80° C. for 6 hours, thereafter it was pulverized and transferred in powdered form to a heating oven and dried at 45° C. for 12 hours to drive off any excess moisture.

EXAMPLE 2

Determining the Solubility of Polyaniline in Organic Solvents Such as N-methyl-2-pyrrolidinone (NMP)

In order to determine the solubility factor of the powdered polyaniline (in the emeraldine base oxidative state) in N-methyl-2-pyrrolidinone (NMP), 10 g. of the dried polyaniline powder produced above was dissolved in 1 liter of NMP based on a ratio of 1 gram/100 ml. 50 ml of 0.1N HCl was added to aid in the dissolution of the polyaniline in NMP. The polyaniline - NMP solution was mixed for 1.5 hours and then subsequently filtered through a Whatman No. 21 filter paper by suction through an aspirator. The precipitate was dried in a heating oven at 80° C. for 5 hours. It was then removed and placed in a desiccator and cooled at room temperature for 1 hour. The solubility of polyaniline in NMP was calculated as follows:

| | |
|---|---|
| original weight of polymer = | 9.8750 g |
| weight of filter paper = | 1.4288 g |
| total polymer weight w/filter paper = | 11.304 g |
| weight of polymer precipitate = | (6.9468 g) |
| net weight of polymer in 1,000 ml of NMP solvent = | 4.3569 g |
| solubility factor of polyaniline in NMP = | 0.4357 g/ 100 ml |

In order to determine the extent of solubility of the polyaniline powder in organic solvents such as N-methyl pyrrolidinone (NMP), different dilutions with water were evaluated to determine the degree of a solubility of polyaniline in a water/NMP mixture.

In this regard, 15.286 g. of the dried polyaniline powder produced above was transferred into 1,070 ml of N-methyl-2-pyrrolidinone (NMP) while the NMP was under agitation. The mixture was agitated for 48 hours in order to insure complete miscibility. 50 ml aliquot of the NMP solubilized polyaniline was placed in a 100 ml graduate cylinder and diluted with another 50 ml of water to produce a 50/50 dilution ("sample A"). After capping the graduate cylinder and shaking it several times it appeared that the NMP solubilized polyaniline was miscible (no precipitation observed) in water at the 50/50 dilution ratio. Thus, it was clear that the additional volume of $H_2O$ (50 ml) did not effect the solubility of polyaniline in NMP.

Another 50 ml aliquot of the 50/50 water/NMP-polyaniline mixture was placed in a separate graduate cylinder. To this sample, an additional 0.20 g. of polyaniline powder was added and the mixture shaken thoroughly ("sample B"). The mixture was filtered through a Buchner Funnel (Whatman filter paper no. 41) and the precipitate which was retained was removed to a vacuum desiccator for drying. This was in order to determine how much of the additional polyaniline powder went into solution in the 50/50 $H_2O$/NMP-polyaniline mixture. The filtrate (sample B) was then removed and placed in a test tube next to the original 50/50, $H_2O$/NMP-polyaniline mixture (sample A).

It was determined that when sample A (original 50/50 dilution, water/NMP-polyaniline) was compared with sample B (50/50 dilution of water/NMP-polyaniline with the additional weight of 0.2 g polyaniline) that sample B had a deeper pinkish-brown color than sample A. This was an indication that more polyaniline was solubilized in the sample (i.e. sample B) in spite of the 50/50 dilution with water.

EXAMPLE 3

Chemical Synthesis of the Polyaniline Coating Composition 100 g. of ferric chloride ($FeCl_3$) was dissolved in one liter of distilled water. The ferric chloride solution was cooled to 10° C. in a water bath.

In a separate 4 liter Erlenmeyer flask, 2,000 ml of a 0.1N HCl solution was prepared and cooled to 10° C. Into the cooled 0.1N HCl solution, 140 ml of aniline was dissolved. The HCl-aniline mixture was stirred while the temperature was maintained at 10° C.

The cooled ferric chloride solution was then slowly added to the cooled HCl-aniline mixture over 3-4 minutes while constantly stirring. The mixture was subsequently stirred for 2 hours while the temperature was maintained at 10° C. After 2 hours and the completion of the polymerization reaction, the mixture was filtered through a Buchner Funnel (Whatman No. 41 filter paper) using a water aspirator. The precipitate in the filter paper was washed with additional 500 ml of 0.1N HCl solution until the filtrate turned clear. The precipitate was then transferred to a vacuum desiccator and dried under vacuum for 6 hours. The precipitate was further dried in an oven at 65° C. for 12 hours, after which time, the precipitate was pulverized and dried in an oven at 65° C. for an additional 3 hours.

After drying, the polyaniline powder was transferred to a desiccator for cooling (about 1 hour cooling time). The polyaniline powder was weighed. The yield was approximately 90% (i.e. 125 g/140 g=90.3%).

While the powdered polyaniline produced (i.e. the emeraldine base) was partially soluble in organic solvents such as NMP, the polyaniline was deprotonated (or dehydrogenated) through the addition of a base to enhance solubility (i.e. to produce the deprotonated pernigraniline). After the polyaniline powder was weighed to determine the percent conversion, the powdered polyaniline (i.e. the emeraldine base) was washed in a Buchner Funnel with 500 ml of distilled water in order to wash away any residual HCl. The polyaniline powder was subsequently transferred to a 4 liter beaker and immersed in 2 liters of 1M $NH_4OH$. The solution was mixed for 45 minutes, after which time the solution was filtered through a Buchner Funnel (Whatman No. 41 filter paper) and the precipitate washed with 500 ml of distilled $H_2O$. The color of the polyaniline polymer changed from a deep blue-green to a coppery-brown color upon deprotonation with 1M $NH_4OH$.

100 g of the deprotonated polyaniline were slowly added to 1 liter of NMP while the NMP was under agitation. The solution turned deep blue in color. The results indicated that the solubility of polyaniline in NMP was dramatically improved after deprotonation of the polyaniline produced (i.e. pernigraniline) with a base such as 1M $NH_4OH$.

EXAMPLE 4

Application of the Polyaniline Coating Composition on Reactor Surfaces

A polyaniline coating composition was prepared containing 1.25% deprotonated (or dehydrogenated) polyaniline (i.e. the polyaniline in the pernigraniline oxidation state) in NMP. Approximately 14 ml of the polyaniline coating composition was applied to the different types of material surfaces such as glass and stainless steel. Upon drying, a film or coating of about 10 micron in thickness was produced. In order to simulate the acidic medium due to the presence of vinyl chloride monomer, the charge water pH was adjusted to a pH of 2 with 0.1N HCl solution, and the water temperature was raised to 65° C.

Materials and Methods

A 2 liter glass reactor vessel was treated with 14 ml of 1.25% deprotonated polyaniline (pernigraniline oxidation state) in NMP (blue color) coating material by spraying the product on the interior surface of the vessel. Immediately thereafter, the vessel was filled with 2 liters of distilled water at 65° C. and a pH of 2.0–3.0 in order to simulate actual PVC polymerization conditions. The volume of water was stirred for 15 minutes in the vessel, then it was emptied into a transparent polyethylene container. No water discoloration was observed.

A 50 ml aliquot was retained for further analysis on a Milton Roy Spectronic 20 Model D spectrophotometer.

The above procedure was repeated 25 times and each time a 50 ml aliquot was retained for further spectrophotometric evaluations.

A set of standards with the following concentrations were chose for this study:

1. Blank (distilled water acidified to pH 2.2 with 0.1N HCl) with a $H_2O$/NMP ratio of 3/1 to represent the actual standards.
2. Standard No. 2 was 2.5 mg/1 polyaniline in 3/1 water/NMP mixture.
3. Standard No. 3 was 5 mg/1 polyaniline in 3/1 $H_2O$/NMP mixture.
4. Standard No. 4 was 10 mg/1 polyaniline in 3/1 $H_2$/NMP mixture.
5. Standard No. 5 was 20 mg/1 polyaniline in 3/1 $H_2O$/NMP mixture.
6. Standard No. 6 was 50 mg/1 polyaniline in 3/1 $H_2O$/NMP mixture.

Upon acidification of the above standards, they underwent a change in color from blue to green. The pH was adjusted to 2.2 with 0.1N HCl.

The absorbance of the above standards was determined on the Spectronic 20 Model D spectrophotometer after instrument calibration with the blank. The results (Table 1 below) were plotted on the graph (FIG. 1) and a calibration curve was established.

TABLE 1

|  | Concentration (Mg/ml) | Absorbance |
|---|---|---|
| Standard No. 1 | 2.5 | .0525 |
| Standard No. 2 | 5.0 | .1125 |
| Standard No. 3 | 10 | .2362 |
| Standard No. 4 | 20 | .4702 |
| Standard No. 5 | 50 | 1.180 |

The results were fairly acceptable and linear in agreement with Beer's Lambert's Law (A=∊bc).

The absorbance of the charge water samples that were retained was then determined using the above procedure. The results of the samples are set forth below on Table 2.

TABLE 2

|  | ABSORBANCE | PA CONCENTRATION |
|---|---|---|
| Sample No. 1 - 1st application | ND | 0.0 |
| Sample No. 2 - 2nd application | ND | 0.0 |
| Sample No. 3 - | ND | 0.0 |

TABLE 2-continued

| | ABSORBANCE | PA CONCENTRATION |
|---|---|---|
| Sample No. 4 - 3rd application | ND | 0.0 |
| Sample No. 4 - 4th application | ND | 0.0 |
| Sample No. 5 - 5th application | ND | 0.0 |
| Sample No. 6 - 6th application | ND | 0.0 |
| Sample No. 7 - 7th application | ND | 0.0 |
| Sample No. 8 - 8th application | ND | 0.0 |
| Sample No. 9 - 9th application | ND | 0.0 |
| Sample No. 10 - 10th application | ND | 0.0 |
| Sample No. 11 - 11th application | ND | 0.0 |
| Sample No. 12 - 12th application | ND | 0.0 |
| Sample No. 13 - 13th application | ND | 0.0 |
| Sample No. 14 - 14th application | ND | 0.0 |
| Sample No. 15 - 15th application | ND | 0.0 |
| Sample No. 16 - 16th application | ND | 0.0 |
| Sample No. 17 - 17th application | ND | 0.0 |
| Sample No. 18 - 18th application | ND | 0.0 |
| Sample No. 19 - 19th application | ND | 0.0 |
| Sample No. 20 - 20th application | ND | 0.0 |
| Sample No. 21 - 21st application | ND | 0.0 |
| Sample No. 22 - 22nd application | ND | 0.0 |
| Sample No. 23 - 23rd application | ND | 0.0 |
| Sample No. 24 - 24th application | ND | 0.0 |
| Sample No. 25 - 25th application | 0.025 | 0.167 |

Results and Discussion

As the number of applications progressed from one to twenty-five, the depth of the green color coating the interior walls of the reactor vessel was intensified to a deeper green. This explained why no coating was detected in the charged water by the absorbance method above.

Based on the original concentration of 1.25% coating, the actual concentration in the charge water, if the product was completely miscible, would have been 87.5 mg/l (ppm) according to the following calculations:

1.25% × 1 × 10$^4$ = 12,500 mg/l 12,500 ÷ 1000 = 12.5 mg/ml of 14 ml application dosage 12.5 × 14 = 175 mg per 14 ml dosage per application 175 mg ÷ 2000 (charge H$_2$O volume) = 0.0875 mg/ml 0.0875 mg/ml × 1000 = 87.5 mg/l = 87.5 ppm However, this was not the case. All of the coating material was adhered to the interior walls of the reactor vessel since none could be detected in the charge water according to the quantitative spectrophotometric method above.

EXAMPLE 5

Comparison of the Polyaniline Coating Compositions of the Present Invention With a Known Polymer Build-up Inhibitor The polyaniline coating composition of the invention was compared with B. F. Goodrich's product ("Code 10C"), which is currently used in the industry for coating PVC reactor vessels prior to polymerization initiation. The B. F. Goodrich product and the present invention were applied on ⅛" glass sheets and subjected to different test conditions.

MATERIALS AND METHODS

Figure 2:
FIG. 2 is a photograph demonstrating the characteristics of a known polymer build-up inhibitor at concentrations of 10%, 5% and 2.5% by weight.

Test Set A (FIG. 2)

This set involved 3 applications with the same volume of B. F. Goodrich's coating composition, namely 20 ml of Code 10C at the following different concentrations:
1. 10% by weight;
2. 5% by weight; and
3. 2.5% by weight.

All the applications were segregated by masking tape in order to prevent any cross-contamination.

Figure 3:
FIG. 3 is a photograph showing the properties of the present invention at concentrations of 1%, 0.5% and 0.25% by weight.

Test Set B (FIG. 3)

The polyaniline composition of the present invention was applied on a separate ⅛" glass sheet using again the same volume of product—20 ml in three adjacent applications but with different concentrations:
1. 1% by weight;
2. 0.5% by weight; and
3. 0.25% by weight.

The regions of the different applications were also segregated by masking tape.

Figure 4:
FIG. 4 is a photograph illustrating the characteristics of a known polymer build-up inhibitor at concentrations of 10%, 5% and 2.5% by weight when subjected to washing.

Test Set C (FIG. 4)

This set was used for testing the durability of the B. F. Goodrich coating product. The same volume (20 ml) and the same concentrations were used as in Test Set No. A, i.e.
1. 10% by weight;
2. 5% by weight; and
3. 2.5% by weight.

Figure 5:
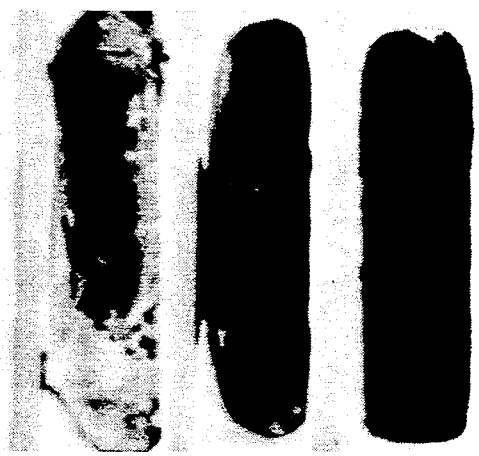
FIG. 5 is a photograph demonstrating the properties of the present invention at concentrations of 0.5%, 0.25% and 0.125% by weight.

Test Set D (FIG. 5)

A lower concentration of the polyaniline composition, but again the same 20.0 ml volume of material was applied on three adjacent regions on ⅛" glass sheet, i.e.
1. 0.5% by weight;
2. 0.25% by weight; and
3. 0.125% by weight.

Test sets A through D (i.e. FIGS. 2-5) were dried at room temperature (25° C.) under laboratory conditions for 48 hours and then at 40° C. for 12 hours in a precision scientific heating oven.

Results and Discussion

In spite of the fact that the concentration per unit volume of the B. F. Goodrich coating product in test set A was 10 times higher than the polyaniline composition in test set B, film continuity was not found in test set A.

More particularly, as the B. F. Goodrich product was dried for 48 hours at room temperature, then 12 hours in the heating oven and then cooled to room temperature, the product peeled off the glass surface and had a dusty appearance to the point that one could scoop it off with the flat edge of a spatula (see test set A set forth in FIG. 2). On the other hand, the polyaniline composition of the invention exhibited much better film continuity, was smoother and did not flake off (see test set B set forth in FIG. 3).

Based on the above observations, test set C, which was identical to test set A in composition and volume of coating produced used (i.e. both B. F. Goodrich product), was elevated to a vertical position (stood at an edge) and sprayed with distilled water using a laboratory rinse bottle. As soon as the water was in contact with the coating, the product flaked off and was washed away with the water (see test set C set forth in FIG. 4). This occurred with all three concentration levels (i.e. 10%, 5% and 2.5%).

The same procedure above was applied to test set B where it was held in a vertical position and sprayed with distilled water numerous times, but the film stayed intact with no peeling or even a trace of dissolution observed. In test set D there was good film adherence and no flaking or washing away upon contact with distilled water.

As indicated in the above description and examples, the polyaniline coating compositions of the present invention, when applied to the reactor surfaces in contact with the reaction medium prior to the charging of the reactor, substantially reduce polymer build-up and thus result in enhanced production rates, lower labor and maintenance costs, etc. Numerous other advantages of the present invention will be apparent to those skilled in the art.

The above description merely provides a disclosure of particular embodiments of the invention and is not intended for the purpose of limiting the same thereto. As such, the invention is not limited to only the above-described embodiments. Rather, it is recognized that one skilled in the art could conceive alternative embodiments and/or modification that fall within the scope of the invention. It is intended that the invention be construed as including all such alternations and modification insofar as they come within the scope of the appended claims or the equivalents thereof.

Having thus described the invention, the inventions is now claimed to be:

1. A method for reducing the build-up of polymers on the internal surfaces of a polymerization reactor which comprises the step of applying to said surfaces a coating composition comprised of a deprotonated polyaniline polymer and an organic solvent.

2. The method of claim 1, wherein the coating composition is comprised of about 0.01% to about 20% by weight of the deprotonated polyaniline polymer.

3. The method of claim 1, wherein the coating composition is comprised of about 0.01% to about 5% by weight of the deprotonated polyaniline polymer.

4. The method of claim 1, wherein the coating composition is comprised of about 0.01% to about 2% by weight of the deprotonated polyaniline polymer.

5. The method of claim 1, wherein the deprotonated polyaniline polymer is polyaniline in the pernigraniline oxidation state.

6. The method of claim 1, wherein the organic solvent is selected from the group consisting of N-methyl-2-pyrrolidinone, dimethyl sulfoxide, formic acid, acetic acid, tetrahydrofuran, and dimethyl formamide.

7. A method for reducing the polymer build-up in a polymerization vessel which comprises the steps of coating the vessel surface that is in contact with the reaction medium prior to polymerization with polyaniline, and charging the polymerization vessel and carrying out the reaction whereby polymer build-up on said surface is reduced.

8. The method of claim 7, wherein the polyaniline is dissolved in a liquid.

9. The method of claim 8, wherein the liquid is an organic solvent.

10. The method of claim 9, wherein the organic solvent is selected from the group consisting of N-methyl-2-pyrrolidinone, dimethyl sulfoxide, formic acid, acetic acid, tetrahydrofuran, and dimethyl formamide.

11. The method of claim 7, wherein the polyaniline is polyaniline in the pernigraniline base oxidation state.

12. The method of claim 9, wherein about 0.01% to about 20% by weight of polyaniline is dissolved in the organic solvent.

13. The method of claim 9, wherein about 0.01% to about 5% by weight of polyaniline is dissolved in the organic solvent.

14. The method of claim 9, wherein about 0.01% to about 2% by weight of polyaniline is dissolved in the organic solvent.

15. A polymerization reactor having on all of the reactor surfaces in contact with the reaction medium during polymerization, a coating composition comprised of a deprotonated polyaniline polymer.

16. The polymerization reactor of claim 15, wherein the deprotonated polyaniline polymer is polyaniline in the pernigraniline base oxidation state.

17. The polymerization reactor of claim 15, wherein the coating composition is about 1.0 μm to about 1500 μm in thickness.

* * * * *